United States Patent [19]

Kuckes

[11] 4,443,762

[45] Apr. 17, 1984

[54] METHOD AND APPARATUS FOR DETECTING THE DIRECTION AND DISTANCE TO A TARGET WELL CASING

[75] Inventor: Arthur F. Kuckes, Ithaca, N.Y.

[73] Assignee: Cornell Research Foundation, Inc., Ithaca, N.Y.

[21] Appl. No.: 273,138

[22] Filed: Jun. 12, 1981

[51] Int. Cl.³ .......................... G01V 3/08; G01V 3/26
[52] U.S. Cl. ........................................ 324/346; 175/45
[58] Field of Search ............... 324/221, 329, 339, 340, 324/342, 343, 346; 166/65 M, 255; 175/40, 45

[56] References Cited

U.S. PATENT DOCUMENTS

| | | |
|---|---|---|
| 1,791,933 | 2/1931 | E. E. Mueser . |
| 1,803,405 | 5/1931 | N. H. Ricker . |
| 1,845,379 | 2/1932 | T. S. West . |
| 1,902,265 | 3/1933 | F. Rieber . |
| 1,906,271 | 5/1933 | Jakosky . |
| 1,934,079 | 11/1933 | H. T. F. Lundberg et al. . |
| 1,997,163 | 4/1935 | Fuschlag . |
| 2,062,630 | 12/1936 | T. Zuschlag . |
| 2,108,463 | 2/1938 | T. Zuschlag . |
| 2,183,565 | 12/1939 | Hawley . |
| 2,199,367 | 4/1940 | L. F. Athy et al. . |
| 2,261,563 | 11/1941 | Rieber . |
| 2,262,419 | 11/1941 | Athy et al. . |
| 2,291,692 | 8/1942 | R. T. Cloud . |
| 2,359,894 | 10/1944 | H. Brown et al. . |
| 2,364,159 | 12/1944 | G. Muffly . |
| 2,401,280 | 5/1946 | Walstrom . |
| 2,663,004 | 12/1953 | H. O. Seigel . |
| 2,698,920 | 1/1955 | Gieske ............................... 324/221 |
| 2,723,374 | 11/1955 | Williams . |
| 2,730,673 | 1/1956 | J. J. Jakosky . |
| 2,787,758 | 4/1957 | Walstrom . |
| 3,014,177 | 12/1961 | Hungerford et al. ........... 324/221 X |
| 3,151,292 | 9/1964 | Eisler . |
| 3,256,480 | 6/1966 | Runge . |
| 3,282,355 | 11/1966 | Henderson . |
| 3,285,350 | 11/1966 | Henderson . |
| 3,329,891 | 7/1967 | Todd . |
| 3,393,732 | 7/1968 | Murphey et al. ................ 324/221 X |
| 3,398,356 | 8/1968 | W. L. Still . |
| 3,479,581 | 11/1969 | Runge . |
| 3,488,574 | 1/1970 | Tanguy . |
| 3,493,850 | 2/1970 | Schuster . |
| 3,525,037 | 8/1970 | T. R. Madden et al. . |
| 3,697,864 | 10/1972 | Runge . |
| 3,722,605 | 3/1973 | Isham . |
| 3,725,777 | 4/1973 | Robinson et al. . |
| 3,731,752 | 5/1973 | Schad . |
| 3,745,446 | 7/1973 | Norris ................................ 324/346 |
| 3,763,419 | 10/1973 | Barringer . |
| 3,772,605 | 3/1973 | Isham . |
| 3,778,701 | 12/1973 | Runge . |
| 3,798,533 | 3/1974 | Schuster . |
| 3,828,867 | 8/1974 | Elwood . |
| 3,849,722 | 11/1974 | Nilsson . |
| 3,894,283 | 7/1975 | Schonstedt . |
| 3,975,676 | 8/1976 | Bliamptis . |
| 3,983,948 | 10/1976 | Jeter . |
| 3,984,758 | 10/1976 | Millon . |
| 4,016,942 | 4/1977 | Wallis et al. . |
| 4,072,200 | 2/1978 | Morris et al. . |

OTHER PUBLICATIONS

"Magrange" Brochure, published by Tensor, P.O. Box 14843, Austin, TX.

"A New Method of Determining Range and Direction from a Reliev Wall to A Blowout Well", by F. J. Morris et al, presented at 52nd Annual Fall Technical Conference & Exhibition of Society of Petroleum Engineers of AIME.

"A New Magnetic Ranging System Pinpoints Blowout Well Location", by F. J. Morris et al, Oil and Gas Journal.

*Primary Examiner*—Gerard R. Strecker
*Attorney, Agent, or Firm*—Jones, Tullar & Cooper

[57] ABSTRACT

A method and an apparatus for determining the exact direction of and distance to a nearby target well having a steel casing from a bore hole are disclosed. A long solenoid having a coil wound on a high permeability core for generating a source magnetic field which, in the absence of a target well, has axial symmetry and is characterized by having a magnetic pole at each end of the core is provided. Directly adjacent to one end of the core is a 3-component ring-type fluxgate magnetometer to detect magnetic field components perpendicular to the axis of the solenoid. The detection apparatus is located in a bore hole, and the magnetic field generated thereby is distorted when the solenoid approaches a target well.

The magnetic field source is mounted in a drill stem which includes one or more nonmagnetic drill collars, the solenoid source being mounted so that its lower end is located within the nonmagnetic collar while the upper end is magnetically connected to the rest of the drill stem. Accordingly, the upper magnetic pole of the solenoid is distributed over a large portion of the drill stem so that the lower portion is, in effect, a monopole source. A ring-type magnetometer is mounted below the monopole source and is co-axial with the solenoid to detect field distortion caused by the target well, and the output of the magnetometer provides a measure of the direction and distance to the target well casing.

15 Claims, 4 Drawing Figures

METHOD AND APPARATUS FOR DETECTING THE DIRECTION AND DISTANCE TO A TARGET WELL CASING

BACKGROUND OF THE INVENTION

The present invention relates, in general, to a method and to apparatus for determining the distance and direction from a bore hole, or well being drilled, to a target well, and more particularly to apparatus for generating a source magnetic field within a bore hole and for measuring distortions in that field caused by a nearby target well casing.

It is well known that in drilling deep wells for oil and gas exploration, precise control of the path followed by the drill is extremely difficult, so that it is virtually impossible to know the exact location of the well at a given depth. For example, a drilling tolerance of $\pm\frac{1}{4}$ of a degree will allow the bottom of a 10,000 ft. well to be positioned anywhere within a circle 87 ft. in diameter, and numerous factors can increase this deviation. This is not of particular concern in normal drilling operations, but if an accident should occur, such as a rupture in the casing of the well which causes the well to blow out, it may become necessary to plug the well at or below the point of rupture to bring it under control. In order to do this, a relief well must be drilled to intersect the original well at the desired level, and since such blow-outs produce extremely hazardous conditions at the surface in the vicinity of the original well, the relief well must be started a considerable distance away and drilled at an incline in order to protect the personnel and equipment used.

Because the same problems of control of the direction of drilling are encountered in the relief well as were encountered in the original well, the location of the relief well bore cannot be determined with precision; accordingly, it is extremely difficult to determine the distance and direction from the relief well to the blown-out well. A further difficulty is that in some cases the force of the explosion resulting from the rupturing of a well casing can do so much damage at the surface that it may be difficult to determine exactly where the wellhead is, much less where the well is located at a depth of 10,000 ft. or more. Because of the danger at the wellhead, the relief well is started $\frac{1}{2}$ mile or more away from the area of the original wellhead, angled toward the original well until it approaches relatively closely, and then follows the original well to the location where the wells are to intersect. Thus, the relief well usually is very complex, compounding the problem of knowing exactly where it is located with respect to the original well.

In addition to the problems encountered in drilling wells so that they intersect at specified levels to relieve blow-out problems, the inverse problem is also very important. That is, it is often extremely important to be able to drill wells so that they do not intersect each other. This is a particularly difficult problem which arises most often when multiple wells are drilled from a single drilling platform in offshore as well as in urban environments.

For example, in some offshore platforms, as many as 72 wells are drilled on 6 ft. centers from a single platform and it is extremely important that there be no accidental well intersections when drilling in such crowded circumstances.

Numerous systems and techniques have been developed in the prior art for determining not only the presence of a target well, but for determining with some degree of accuracy its general direction. Examples of such prior devices are found in U.S. Pat. application Ser. No. 203,912 of Arthur F. Kuckes, filed Nov. 4, 1980, now U.S. Pat. No. 4,372,398, issued Feb. 8, 1983, entitled "Method of determining the Location of a Deepwell Casing by Magnetic Field Sensing", and in the prior art discussed in that patent. However, it has now been found that potentially serious problems are encountered when routine use of such prior devices is contemplated for ascertaining the exact distance to adjacent wells, for the parameters relied upon in those prior systems are now found to vary considerably and to adversely effect the accuracy of measurements made by such systems.

Some prior art systems and methods rely on the remanent magnetism of the casing in a target well and use highly sensitive magnetometers to detect that magnetism and to determine the distance to the well. Gradiometers are used in conjunction with such devices to eliminate the effect of the earth's magnetic field, which is assumed to be a constant. Other devices rely on the conductivity of the earth and of the casing to permit the flow of electric currents which are used in detecting the location of the target well.

It has been found, however, that the remanent magnetism in target casings is highly variable since the the casings take on magnetization by induction in the earth's magnetic field, and because of the diverse nature of the magnetizing factors and the histories of the materials which are used in the casings. Such variations in the remanent magnetism make it extremely difficult to ascertain with any accuracy the exact distance from a magnetic field sensor to the target well. It has also been found that the variations in the earth's conductivity, the effect of a concrete sheath on the target well, and other similar factors also make accurate measurements difficult, and accordingly the results obtained by such prior systems cannot be relied upon with any degree of safety.

A further problem lies in the fact that many of the sensing devices proposed in the prior art require removal of the drill string from the well being drilled before the logging equipment can be lowered into position for measurement. This is a time consuming and expensive task, and in the case of a runaway well, allows the serious consequences of such an accident to continue unabated for an excessive amount of time.

SUMMARY OF THE INVENTION

The present invention is directed to a detection apparatus and method which relies upon the fact that the magnetic permeability of a target well casing is high with respect to the surrounding earth, and will therefore concentrate magnetic fields which have a dominant component parallel to the axis of the casing. This concentration produces a distortion in the usual symmetry of the magnetic field, and this distortion can be accurately measured to determine the exact direction and distance from the well being drilled to the target well. Thus, it is an object of the present invention to overcome the difficulties encountered in the prior art by providing a magnetic field source which can be distorted by the casing in a target well, and which distortion can be measured accurately by highly sensitive fluxgate magnetometers, thereby permitting accurate determination of the direction and distance to the target well.

Briefly, the present invention is directed to a detector system comprising a long solenoid coil wound on a high permeability core and excited by a periodically reversing current. The solenoid generates a source magnetic field which has axial symmetry and is characterized by having a magnetic pole at each end of the core. Directly adjacent to the end of the core is a fluxgate magnetometer having an axis coaxial with the axis of the core so that the fluxgate is essentially insensitive to the axial magnetic field generated by the source, but is sensitive to the magnetic field vector components perpendicular to that axis. This detector system is located in a well bore, and when the well bore approaches a target well having a casing, the magnetic field lines produced by the solenoid are distorted. The vector components of this distortion are measured by the magnetometer to produce output signals proportional to the detector field. These output signals may then be analyzed to determine the exact distance and direction to the target well. The signals produced by the magnetometer in this configuration depend upon the secondary field generated by the target well and the concentration of this secondary field by the solenoid core, so it is important to have the magnetometer close to the end of the solenoid core.

Although the detection range of the present device is lower than that of the device described in the aforesaid application Ser. No. 203,912, it is capable of giving a better absolute determination of distance when the two wells are close together. This is due to the fact that the signal strength generated by the magnetometer depends only upon the distance, dimensions and permeability of the target well casing, and since the dimensions and permeability are well known, and the characteristics of the solenoid source and of the receiver are well known, the distance to the target well is easily obtained.

In accordance with a preferred embodiment of the invention, the solenoid magnetic field source is incorporated in the drill string of the well being drilled, thereby permitting measurements to be made without requiring withdrawal of the tool bit from the well bore or the use of a wire line to lower the measuring instruments into the hole, while permitting measurements to be made intermittently or continuously during drilling. This is particularly important when a relief well is very close to a blown-out well which is to be intercepted, or in the avoidance of other wells in the course of drilling from an offshore platform. Continuous measurement is accomplished by providing in the drill stem one or more non-magnetic drill collars, preferably located near the drill bit. Inside the nonmagnetic drill collar is the solenoid source, with the upper end of the solenoid source being connected in a magnetic circuit with the magnetic portion of the drill stem. This causes the upper magnetic pole of the solenoid to be distributed over, for example, 20 or more feet of the drill stem. The lower end of the solenoid source, and thus the lower magnetic pole, is situated within the nonmagnetic drill collar to provide the effect of a single pole solenoid. The fluxgate magnetometer is located within this same drill collar near the lower end of the solenoid core. In this system, the electric power for the solenoid and for the magnetometers may be derived either from batteries or from a downhole generator, and the information derived from the magnetometers may be returned to the surface by any suitable means, for example, by digital encoding of pressure pulses on the drill mud.

Although ring core fluxgate magnetometers are known, their very high sensitivity to transverse fields makes them particularly suited for the present application. A ring core having its axis coinciding with the axis of the solenoid is insensitive to the axial field generated by that solenoid, since the perturbations induced in the ring core by the source field are symmetric. Accordingly, the ring core is not susceptible to generating spurious signals caused by the primary source field.

In the preferred form of the invention, the current in the source field solenoid is reversed once every few seconds, although a higher frequency which is compatable with the finite skin depth of the target well, and of the design characteristics of the source solenoid and the magnetometer would be advantageous. The use of phase sensitive detector circuits connected to the magnetometer make possible a simple device with high reliability.

BRIEF DESCRIPTION OF THE DRAWINGS

The foregoing and additional objects, features and advantages of the present invention will become apparent to those of skill in the art from a consideration of the following detailed description of a preferred embodiment thereof, taken in conjunction with the accompanying drawings, in which.

DESCRIPTION OF PREFERRED EMBODIMENTS

Figure 1:
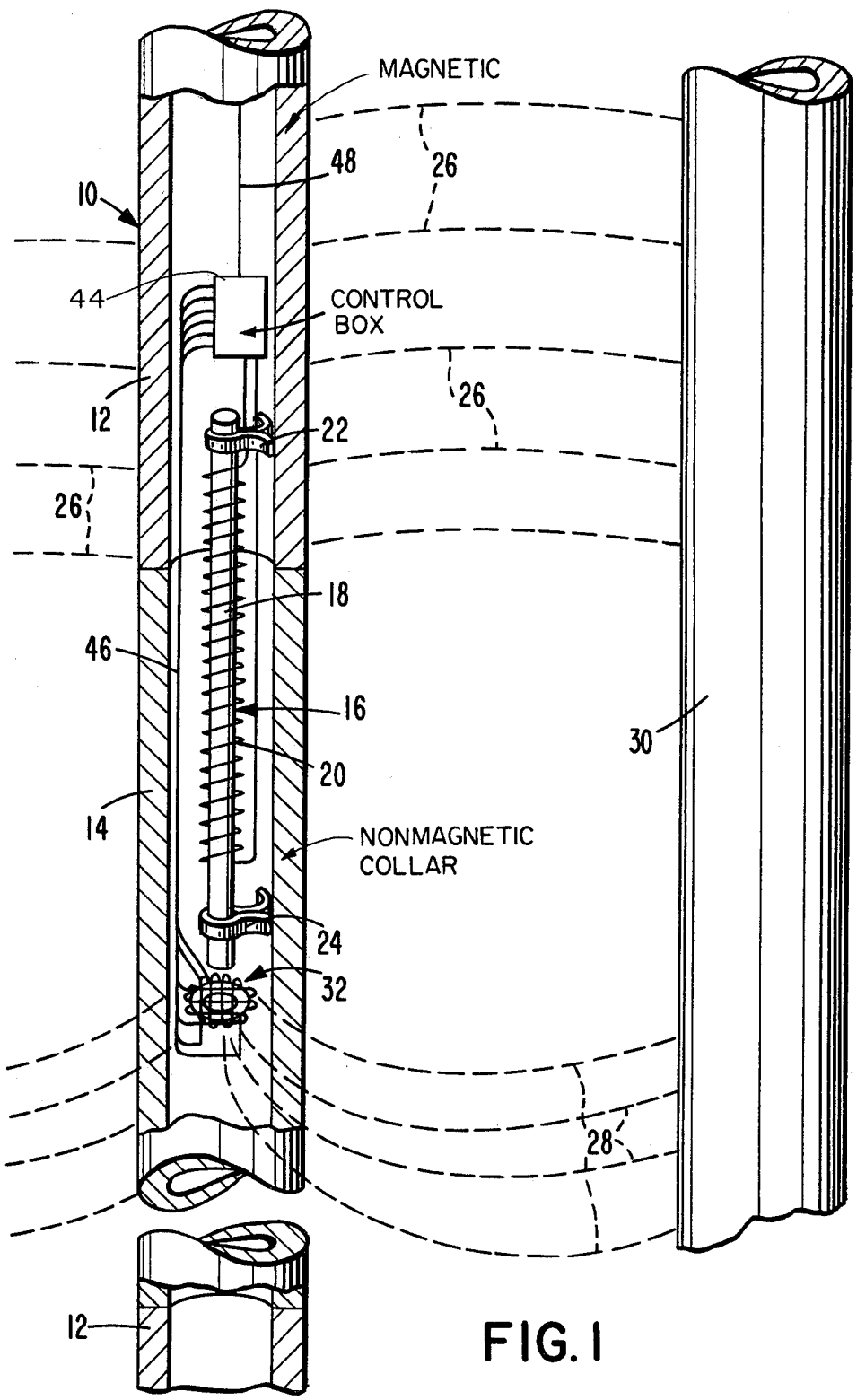
FIG. 1 is a diagrammatic illustration of a well casing detector system including a magnetic field generator and a fluxgate magnetometer mounted within a drill string having a nonmagnetic collar portion, in accordance with the present invention.

Turning now to a more detailed consideration of the present invention, there is illustrated in FIG. 1 a conventional drill stem 10 assembled from the usual high strength tubular drill rods 12. Near the bottom of the drill stem, near to the drill bit, one or more nonmagnetic tubular drill collars 14 are connected in the drill stem, the drill collars being secured to the steel drill rods 12 in known manner to form a nonmagnetic portion of the drill stem 10. The nonmagnetic collars may be constructed from, for example, gammalloy or other conventional materials. Mounted within the tubular drill collar 14 is a solenoid 16 consisting of a long, slender core element 18 of a high permeability magnetic material such as mu-metal, around which is wound a long coil of wire 20. The solenoid may, for example, consist of a core rod 6 feet, long and $\frac{3}{8}$ inch in diameter carrying two layers of #18 insulated wire wound on the central four feet of the core. When energized from a suitable source of reversible current, the solenoid 16 produces a source alternating magnetic field which is characterized by a pole at each end of the core 18.

The upper end of the solenoid core 18 extends upwardly into the hollow interior of the tubular drill rod 12 which is connected to the upper end of the nonmagnetic collar 14. The solenoid is secured in longitudinal alignment with the drill stem and collar by any suitable means such as upper and lower clamps 22 and 24, respectively. The clamps may be secured to the inner wall surfaces of drill rod 12 and collar 14 to hold the solenoid securely in place during drill operations. Preferrably, the solenoid is coaxial with the drill stem and thus with collar portion 14. It will be understood that clamps 22 and 24 are merely illustrative, and that any suitable means may be provided for securing the solenoid in place.

By extending the upper end of selonoid 16 into the drill rod portion 12, the solenoid's upper end is connected in a magnetic circuit with the drill rod 12 so that the upper magnetic pole of the solenoid is distributed over 20 or more feet of the drill stem 10. This magnetic coupling is diagrammatically illustrated by the spaced magnetic field lines 26, which extend radially from the drill rod 12, and which, in the absence of any magnetic material in the vicinity, will have axial symmetry with respect to the drill stem.

The lower end of the solenoid is located within the nonmagnetic collar 14 so that the solenoid acts as a monopole field source, thus producing a magnetic field having the magnetic field lines generally illustrated at 28. Again, in the absence of magnetic material in the vicinity of the drill stem 10, this field has axial symmetry.

When the solenoid 16 is mounted in a drill stem for use, and an alternating power source is applied across the coil 20, the solenoid produces a symmetrical magnetic field. However, as the drill approaches the casing 30 of the adjacent well which is to be intersected or is to be avoided, depending upon the purpose of the well being drilled, the magnetic material of the casing 30 will distort the symmetry of the magnetic field 28 produced by the solenoid. This is due to the fact that well casings are constructed of a high permeability metal which provides a good return path for the magnetic field produced by solenoid 16, and thus serves to concentrate that field in the radial direction from the solenoid to the casing, thereby disrupting the symmetry of the magnetic field.

The magnetic field produced by the solenoid 16, and particularly the distortion in the field caused by the target well casing, is measured by means of a ring-type fluxgate magnetometer 32 located near the lower end of solenoid 16 and axially aligned therewith. The magnetometer, which is of conventional construction, is diagrammatically illustrated in FIG. 2, to which reference is now made. As illustrated, the magnetometer includes a ring core 34 on which is wound a toroidal excitation winding 36 to which is connected an alternating drive current from a source 38. Preferably, the drive current is generated by means of a power source located in the drill string near the well casing detector system. This source may, for example, be battery pack driving a suitable oscillator to produce the required alternating current for the drive coil 36, may be a turbine driven by the drilling mud, or may be any other suitable source.

The alternating current may operate, for example, at 16 kHz and serves to drive the ring core 34, which has a square hysteresis loop, to saturation in each direction. Surrounding the core 34 and its winding 36 is a first field detecting winding 40 which, for purposes of clarity, is shown as a single turn but which normally will have a large number of turns, as is known in the art. This winding, which has its axis perpendicular to the axis of the core, operates to measure magnetic field vectors in a direction parallel to its axis. A second field detecting winding 42 is also wound around the core 34 and its excitation winding 36, and this winding is also shown as a single turn for purposes of clarity. The axis of winding 42 lies in the same plane as the axis of coil 40, but at right angles thereto, and windings 40 and 42 thus cooperate to measure the magnetic field strength in the x and y directions.

Figure 2:
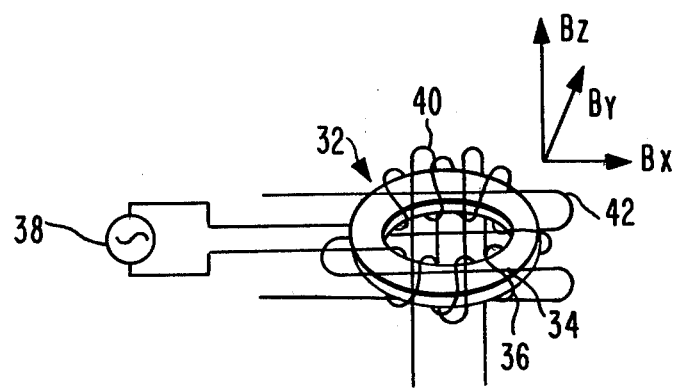
FIG. 2 is an enlarged diagrammatic illustration of the magnetometer of FIG. 1.

Ring core magnetometers of the geometry illustrated in FIG. 2 have a very high sensitivity to transverse magnetic fields, i.e. fields in the x and y directions, and accordingly the output signals from coils 40 and 42 provide an accurate and sensitive meaurement of the amplitude of the vector components of the field 28. When the axis of the ring core 34 coincides with the axis of the solenoid 16, the magnetometer is highly insensitive to the axial fields generated by the solenoid.

The current source for the drive coil 36 and the sensing electronics for receiving the output signals from coils 40 and 42 are located in a control box 44 mounted within drill stem 10, the control box being connected to the magnetometer by way of a suitable cable 46. The power supply for the solenoid winding 20 is also located in control box 44 and is connected thereto by suitable leads. The control box may incorporate a battery power supply or may be connected to an exterior power source such as a turbine generator driven by the drilling mud used in conjunction with the drill string 10. The magnetic field vector information derived from the magnetometer windings 40 and 42 may be returned to the surface by a suitable cable 48, or by means of digital encoding of pressure pulses on the drilling mud as it circulates, in known manner.

Although the single core magnetometer of FIG. 2 located at the lower end of the solenoid is satisfactory, it may be desired to utilize two such magnetometers, one at each end of the solenoid, or the unit may be inverted, to provide a monopole source at the top of the solenoid. Another alternative is a provision of the magnetometer having two cores, one carrying the x axis sensing winding 40 and the other carrying the y axis sensing winding 42. Furthermore, it may be desired to provide spaced pairs of cores in the manner illustrated in FIG. 3 to provide a gradiometer arrangement which compensates for the earth's magnetic field or other ambient fields and which also measures changing field strength as the drill stem 10 advances. In this case, the solenoid 16 is mounted above first and second spaced pairs of magnetometers 50 and 52, the first pair including x and y magnetic field vector cores 54 and 56 located near the lower end of solenoid 16 and the second pair including x and y vector cores 58 and 60 located at a considerable distance below the first pair 50. The distance between the pairs is selected in accordance with the sensitivity of the magnetometers and the strength of the magnetic field gradient to be measured, and the outputs of these cores provide a measure of the change in field strength over that distance.

Figures 3, 4:
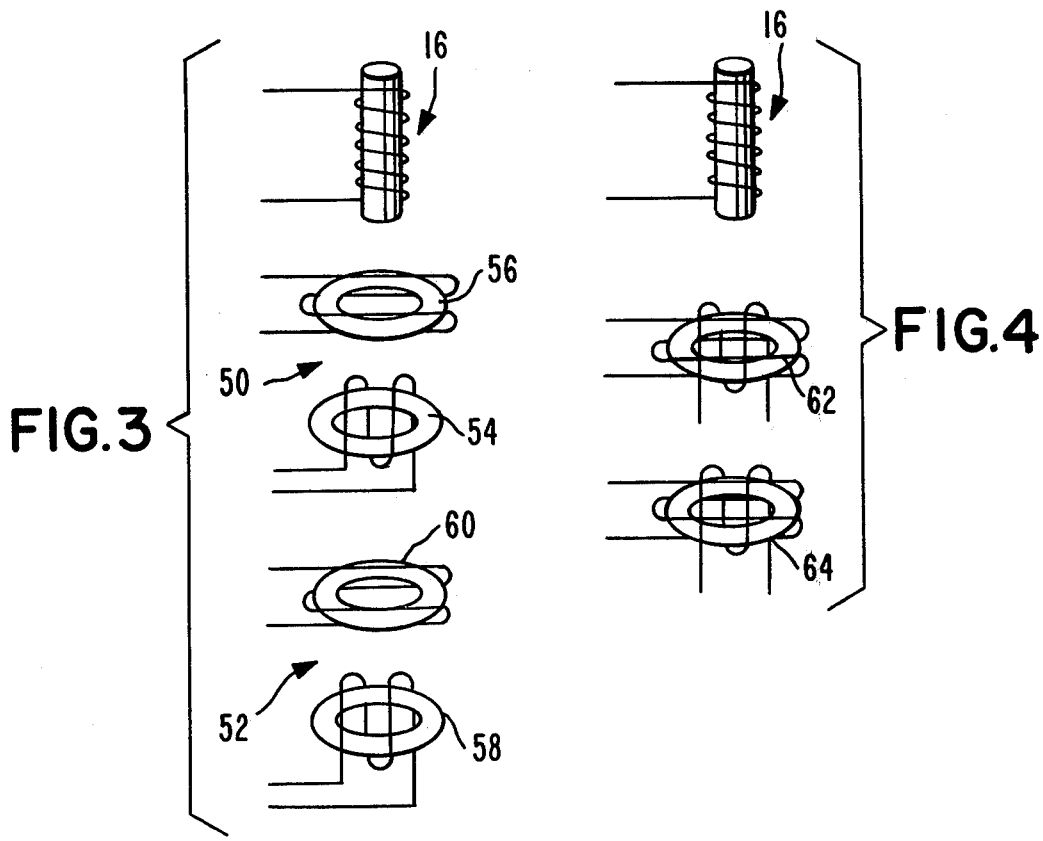
FIG. 3 is a diagrammatic illustration of a pair of two-core magnetometers spaced apart to provide a gradiometer.
FIG. 4 illustrates a two-core gradiometer arrangement.

As illustrated in FIG. 4, field gradient measurements may be made by means of spaced ring core magnetometers 62 and 64 axially located below solenoid 16, generally in the manner of FIG. 3; however, in this arrangement each of the ring cores carries both x and y axis windings in the manner of FIG. 2.

In use, the well casing detector system of the present invention is mounted with a drill string 10 and the drill is operated in the normal manner to drill a bore hold. This bore hole may either be a relief well intended to intersect an adjoining well casing 30 or may be a new well which is to avoid all existing wells in the area. In either event, the drill is advanced in the normal way, and each time that drilling is haulted for example, to allow attachment of a new length of drill pipe, the solenoid 16 is activated and measurements are made of the field 28 produced by the monopole field source at the lower end of the solenoid. In normal use, such measurements would be made about every 30 feet of drilling depth. An important advantage of this method is that such measurements may be made without requiring withdrawal of the tool bit so that the drilling process is not interrupted. The field vector measurements obtained by the magnetometer are sent to the surface, where they are analyzed through conventional vector analysis techniques to determine the direction and amplitude of the detected field, as distorted by the targer well casing. The distorted field provides an accurate indication of the exact location of the casing, thus providing a more accurate measurement than was previously available.

Although the detection range for the present system is much less than that of many other systems, and is comparable to many systems at a range of about 20 feet, the present system is capable of giving a better absolute determination of distance when the borehole and the target well are closer together than about 20 feet. The invention is particularly useful in providing a warning of a close approach to the target well 30 in that it produces a relatively sharp threshold as the nearby well is being approached, for when the distance to the target well is more than one-half the length of the solenoid source 16, the signal strength from the magnetometer falls off rapidly.

The magnetometer output is proportional to the amplitude and direction of the magnetic field at the location of the magnetometer, and this in turn is affected by the distortion created by the nearby target well 30. The strength of the field in the radial direction from the drill string 10 to the target casing 30 depends only upon the distance dimensions, and permeability of the target well, and does not rely upon the remanent magnetism of that target. Furthermore, the distance and the dimensions of the casing have the primary effect on the field 28 while the permeability has much less effect, and since the dimensions of the target casing are well established, the distance may be determined from the magnetometer output with a great deal of accuracy, within the range of the unit.

Although the invention has been described in terms of a preferred embodiment, it will be apparent to those of skill in the art that various changes can be made without departing from the true spirit and scope thereof. For example, in the detector system as illustrated the solenoid and magnetometer preferrably are mounted within a drill system to effectively lengthen the solenoid core. However, in some situations it may be desirable to operate the solenoid and magnetometer in a "stand alone" configuration or in a housing other than a drill stem. In one preferred alternative, the solenoid and magnetometer may be secured in a suitable housing, such as a typical instrument Sonde at the end of a wireline, which may be lowered into a bore hole after the drill stem has been withdrawn. The Sonde must have a nonmagnetic portion for operation of the magnetometer, but when used in this manner, the solenoid and magnetometer operate in essentially the same manner as when mounted in a drill stem. However, this arrangement does not have the advantage of the effective lengthening of the solenoid by the magnetic material of the drill stem and the resultant monopole effect described above. Typically, the Sonde is moved a predetermined distance in the well bore between measurements of the magnetic field distortions produced by the target well casing, and the measurements are used to plot the direction of and distance to the target well casing.

Although reference is made in the specification to mounting the solenoid and magnetometer within a nonmagnetic collar in the drill stem, an alternative to the described structure is the provision of a nonmagnetic drill stem section.

Various other changes may be made, and accordingly it is desired that the scope of the invention be limited only by the following claims:

What is claimed is:

1. A method for detecting the direction of and distance to a target well having a casing from a bore hole being drilled, comprising:
    mounting within a drill stem for said bore hole a vertically oriented, coaxial, elongated solenoid having a core and a winding on said core;
    mounting a magnetometer within said drill stem immediately adjacent one end of said solenoid;
    providing a nonmagnetic collar in said drill stem, said nonmagnetic collar surrounding said one end of said solenoid and surrounding said magnetometer;
    magnetically coupling the other end of said solenoid to said drill stem;
    advancing said drill stem in said bore hole;
    energizing said solenoid by means of a periodically varying current to produce a source magnetic field surrounding said bore hole, said magnetic field being symmetrical with the common axis of said solenoid and said bore hole in the absence of a nearby target well; and
    energizing said magnetometer to detect distortions in said source magnetic field, the direction and amplitude of said distortions providing an exact measure of the direction and distance of said target well casing.

2. A well casing detector system for detecting the direction of and distance to a target well having a casing, comprising:
    a housing having a magnetic portion and a nonmagnetic portion;
    an elongated solenoid comprising a high permeability core and coil surrounding a major part of the length thereof;
    means for energizing said solenoid coil to produce a source magnetic field axially symmetrical with respect to the axis of said solenoid;
    means for securing said solenoid within and generally parallel to the axis of said housing, a first end of said solenoid being secured within said nonmagnetic portion of said housing and a second end of said solenoid being magnetically coupled to said magnetic portion of said housing for distribution of the magnetic pole corresponding to said second end, whereby said first end of said solenoid acts as a monopole magnetic field source;
    a magnetometer mounted adjacent said first end of said solenoid; and
    means for energizing said magnetometer to detect distortions in said magnetic field due to a target well casing, said magnetometer producing an output proportional to the vector components of said distorted field whereby the direction and distance of said target well casing from said detector system is measured.

3. The apparatus of claim 2, wherein said magnetometer includes a ring core coaxial with said solenoid core.

4. The apparatus of claim 3, further including gradiometer means adjacent said solenoid.

5. The apparatus of claim 3, wherein said solenoid core is of mu-metal, and wherein said solenoid coil extends along about two-thirds the length of said solenoid core.

6. The apparatus of claim 3, wherein said solenoid coil is energized by means of periodically varying current.

7. The apparatus of claim 3, wherein said ring core is insensitive to axial magnetic fields.

8. The apparatus of claim 3, wherein said housing is a drill stem.

9. The apparatus of claim 3, wherein said housing is an instrument Sonde.

10. A well casing detector system for detecting the direction of and distance to a target well having a casing, comprising:
   a drill stem for a well bore having a first portion consisting of a plurality of drill rods of magnetic material and a second portion consisting of at least one nonmagnetic drill collar portion interposed in said drill stem;
   an elongated solenoid comprising a high permeability core and a coil surrounding a major port of the length thereof;
   means for securing said solenoid within said drill stem with at least a part of said solenoid being located within said nonmagnetic drill collar portion and at least a part of said solenoid being located within said drill rod portion, whereby one end of said solenoid is magnetically coupled to said drill stem, said solenoid being secured in longitudinal alignment with said drill stem;
   a magnetometer mounted within said nonmagnetic collar portion in coaxial alignment with said solenoid and adjacent one end thereof;
   means for energizing said solenoid coil to produce a source magnetic field axially symmetrical with respect to the axis of said solenoid and extending out of said nonmagnetic collar portion; and
   means for energizing said magnetometer to detect distortions in the symmetry of said source magnetic field due to a target well casing, said magnetometer producing an output proportional to the vector components of the distorted field whereby the direction and distance of said target well casing from said detector system is measured.

11. The well casing detector system of claim 10, wherein said solenoid core is a rod approximately six feet long and ⅜ inch in diameter, and wherein said solenoid coil is wound around the central four feet thereof.

12. The well casing detector system of claim 10, wherein said means for energizing said solenoid core comprising a periodically varying source of current.

13. The well casing detector system of claim 10, wherein said magnetometer is a ring core fluxgate magnetometer and wherein said ring core is coaxial with said solenoid.

14. A method for detecting the direction of and distance to a target well having a casing of magnetic material from a nearby borehole, comprising:
   mounting within a housing of magnetic material a vertically oriented, elongated solenoid having a core and a winding on said core;
   mounting a magnetometer within said housing immediately adjacent one end of, and coaxial with, said solenoid;
   providing a nonmagnetic portion in said housing adjacent at least said one end of said solenoid and adjacent said magnetometer;
   magnetically coupling at least a portion of said solenoid to said housing;
   moving said housing through said bore hole;
   energizing said solenoid by means of a periodically varying current to produce a monopolar source magnetic field in the earth in the vicinity of said bore hole, said magnetic field being substantially symmetrical with respect to the common axis of said solenoid and said magnetometer in the absence of a nearby target well casing; and
   energizing said magnetometer to detect distortions in said source magnetic field, the direction and amplitude of said distortions providing an exact measure of the direction of said well casing.

15. The method of claim 14, wherein the step of moving said housing comprises intermittently advancing said housing through said bore hole, and periodically detecting distortions in said source magnetic field.

* * * * *